Figure 1:
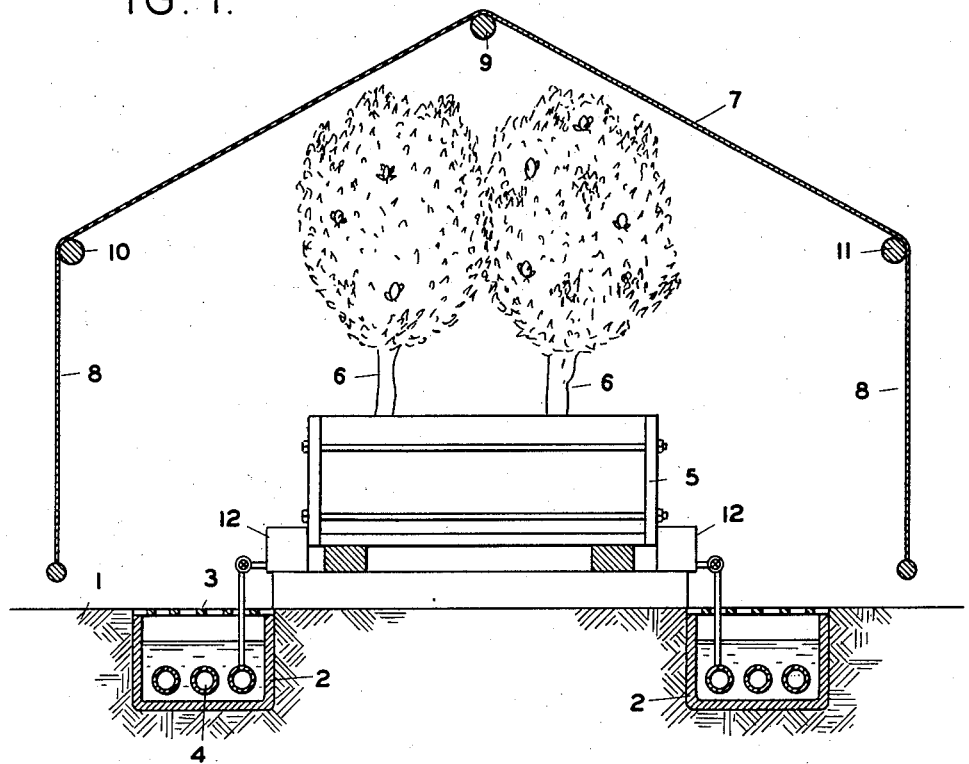

Feb. 2, 1937. C. H. WALKER 2,069,292
METHOD OF FORCING PLANT GROWTH
Filed March 17, 1936

INVENTOR:
CLARENCE H. WALKER.
BY *Baldwin Vale*
ATTORNEY

Patented Feb. 2, 1937

2,069,292

UNITED STATES PATENT OFFICE 2,069,292

METHOD OF FORCING PLANT GROWTH

Clarence H. Walker, San Mateo, Calif.

Application March 17, 1936, Serial No. 69,300

7 Claims. (Cl. 47—58)

This invention relates to improvements in the method of forcing plant growth.

An object of the invention is to artificially expedite the forming, blooming and maturing of plant buds and to increase the productivity of plants.

Another object is to artificially raise and maintain the impounded atmospheric humidity to near the dew point of saturation for the given growing temperature.

Another object is to control the element of time in the production of plant blossoms to meet the demands of the flower trade, without respect to natural, geographic, climatic or seasonal conditions.

Another object is to increase the number of matured blossoms per plant unit and lower the cost per blossom matured.

A further object is to improve the quality of the plant foliage blossoms and their supporting stems.

Other objects and advantages will appear as the description progresses.

In this specification and the accompanying drawing the invention is described with special reference to certain species of blossoming plants. It is to be understood however that it is not limited to such specific application, because it may also be applied to flower and fruit bearing plants of different genera and species with appropriate modifications, without departing from the spirit of the invention as defined in the claims following the description.

Broadly stated the invention consists in determining the proper temperature for a given form of plant, enclosing the budding plant and subjecting it to an impounded atmosphere of relative humidity near to saturation until the buds have matured into blossoms.

The usual natural daily variations of temperature and humidity are avoided. Natural daylight or artificial light having actinic qualities can be used in flower species requiring light to develop their color values.

Gardenias, Cape-jasmine and similar species of white flowers have been developed to full maturity in total darkness by this method with all their size, form, perfume and characteristic qualities.

In the above instances, for example, normal plants with initial buds subjected to the conventional hot house conditions, will mature marketable blossoms in from two to three weeks, with a considerable loss of dead or dropped buds. By the present method superior full blossoms will mature in from twelve to thirty-six hours, with little or no loss of buds or stamina.

In one instance a gardenia plant was chosen from among plants of like quality. Within thirty-six hours this one plant, subjected to the present sweating method produced three marketable blossoms. But the other forty plants, under regular hot house conditions, matured only one blossom among them in three weeks.

Under the present method the impounded atmosphere is maintained continuously at the dew point or practically at relative humidity approaching saturation. The interior surfaces of the enclosure, and the surfaces of the plants show accumulations of moisture that would rot the blossoms under any natural or other condition known to me.

In the one sheet of drawings, Fig. 1 is a vertical section of a sweating unit, diagrammatically illustrating means for practicing this method in accordance with my invention.

Figure 2:
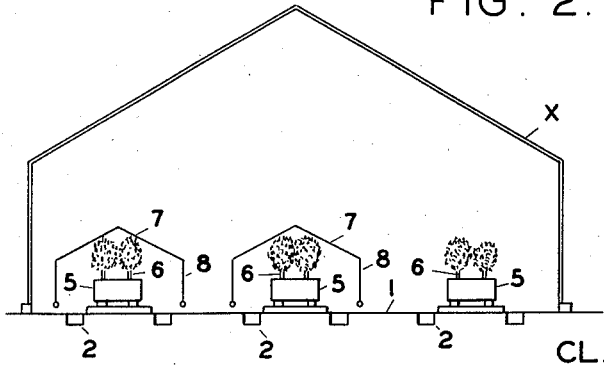

Fig. 2 is a schematic end view of a pair of sweating units installed in a conventional hot house.

A characteristic apparatus for the present purpose, could be set up within a green house or any other suitable enclosure adapted to admit light and ventilation while protecting against storms, winds, rain and violent atmospheric disturbances such as indicated by x.

In detail the structure shown in the drawing comprises the floor 1, having the troughs or sunken channels 2, 2 therein and covered by suitable gratings 3. The steam pipes 4 are installed in these troughs. The water should completely submerge the steam pipes 4. The heat from the pipes 4 evaporates the water to humidify the atmosphere. The usual bench 5, supported above the floor for convenience, contains a bed of soil within which the shrubs or plants 6, 6 are rooted in the conventional hot house manner.

The covering or tent 7 of canvas, glass or any suitable material, preferably transparent or translucent and adapted to pass ultra-violet and other plant activating light rays encloses the plants. The depending aprons 8, 8 prevent the escape of the humidified and artificially heated atmosphere within the tent and prevent air currents and mechanical disturbance of the enclosed atmosphere which it is desirable to maintain as substantially static as the acts of cultivation, harvesting and ventilation will permit. The aprons can extend to the floor where conditions require less ventilation.

The tent can be supported from below on the poles 9, 10 and 11 or in any other suitable manner. The attendants may work beneath the tent or it may be arranged so that portions may be lifted and the attendant stand outside the tent.

It is not the primary purpose to force the growth of the plant itself, but the hasten the development of flowers from the bud to maturity, before and after which the plant is subjected to the usual hot house technique.

A typical condition for sweating gardenias or Cape jasmine by this method would be to select plants having initial buds and subject them to a temperature range of 70° to 82° F. (dry bulb thermometer) with a maintained humidity of 91%. By using wet and dry bulb thermometers, the temperature rise in the dry thermometer will be accompanied by a drop in temperature in the wet thermometer. The desired humidity can be increased or diminished as indicated by the temperature differential between the two thermometers.

As the temperature increases in the steam pipes 4, vapors will rise from the water in the troughs 2 causing an increase in the percentage of humidity.

Better to control the volume of humidity, the vapor units 12 containing water are arranged at intervals and connected with the steam pipes. If more humidity is desired steam is turned into these auxiliary units 12. This can be done automatically by humidity controlled valves, not shown.

It is desirable that a high percentage of humidity at the temperature be maintained to induce forced blooming. The temperature controls the element of time, the higher temperature around 82° F. shortens the blooming period, while the lower temperatures around 70° F. slow up the development.

By dropping both the temperature and humidity, conventional hot house conditions can be maintained. This is resorted to when there is the danger of overproduction when the market demand is weak. Contrawise, a rising market demand can be met by a proportional rise in temperature and humidity.

This method gives complete control over the blooming period of any given set of plants, from twelve hours to three weeks or more, regardless of the normal volition of the natural plant. It is planned production controlled to the last degree within the range of a known market demand.

This is in comparison with the usual hot house conditions which show during ordinary daylight, temperatures ranging from 81° to 84° F., with a humidity range from 54% to 63%. At night the condition is 64° to 65° F., temperature, to 73% to 76% humidity, showing a rise in humidity at night with a drop in temperature, the condition reversing during the day. At the time of these comparative tests the exterior conditions showed during the day 66° F., and 70% humidity, with very low variable temperatures and low humidity. Where the plants have to automatically adjust themselves to such natural alternations and variations in temperature and humidity, blooming is seriously interfered with; the plants often dropping their buds to an extent to cause a partial or total loss of blossoms for the season.

Having thus described this invention, what is claimed and desired to secure by Letters Patent is:

1. The method of forcing plant growth consisting of establishing conditions favorable to plant growth, then raising and maintaining the relative atmospheric humidity to near saturation.

2. The method of forcing plant growth consisting of establishing conditions favorable to plant growth, and then subjecting said plants to humidity in excess of normal during the forcing period.

3. The method of forcing plant growth consisting of enclosing the plant and establishing conditions favorable to plant growth then maintaining within said enclosure relative atmospheric humidity to near saturation.

4. The method of forcing plant growth consisting of subjecting plants to an impounded atmospheric humidity near the dew point of saturation for the given growing temperature during the productive period of said plants.

5. The method of forcing the floral productivity of plants consisting of subjecting plants to an impounded atmospheric humidity near the point of saturation for the given growing temperature, and maintaining substantially such atmospheric condition during the glooming period of said plants.

6. The method of plant cultivation consisting of developing and maturing plants under usual conditions, then subjecting the plants during the period of production to an atmosphere having a relative humidity near the point of saturation for the given temperature.

7. The method of plant cultivation consisting of developing and maturing plants under usual conditions, then subjecting the plants during the period of production to an increase of temperature and to a relative atmospheric humidity near the point of saturation for the given temperature.

CLARENCE H. WALKER.